(12) United States Patent
Teng et al.

(10) Patent No.: US 10,565,267 B1
(45) Date of Patent: Feb. 18, 2020

(54) DETERMINING A QUALITY SCORE FOR A CONTENT ITEM

(71) Applicant: GOOGLE LLC, Mountain View, CA (US)

(72) Inventors: Junbin Teng, Mountain View, CA (US); Anja Hauth, Palo Alto, CA (US); Alexander Sobol, Los Altos, CA (US); Boris Mazniker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/660,862

(22) Filed: Jul. 26, 2017

Related U.S. Application Data

(63) Continuation of application No. 14/037,219, filed on Sep. 25, 2013, now Pat. No. 9,727,644.

(60) Provisional application No. 61/707,863, filed on Sep. 28, 2012, provisional application No. 61/707,869, filed on Sep. 28, 2012.

(51) Int. Cl.
  *G06F 16/95* (2019.01)
(52) U.S. Cl.
  CPC .................................. *G06F 16/95* (2019.01)
(58) Field of Classification Search
  CPC ........... G06F 17/3053; G06F 17/30867; G06F 17/30958; G06F 17/30528; G06F 17/3097
  USPC ........... 707/600–831, 899, 999.001–999.206
  See application file for complete search history.

(56) References Cited

U.S. PATENT DOCUMENTS

| | | | |
|---|---|---|---|
| 8,489,515 B2 | 7/2013 | Mathur | |
| 8,843,479 B1 | 9/2014 | Bharat | |
| 8,918,404 B1 | 12/2014 | Dachille | |
| 8,990,951 B1 | 3/2015 | Kruger et al. | |
| 2008/0028294 A1 | 1/2008 | Sell et al. | |
| 2008/0040474 A1 | 2/2008 | Zuckerberg | |
| 2009/0158399 A1 | 6/2009 | Cooley et al. | |
| 2009/0164913 A1 | 6/2009 | Davar et al. | |
| 2009/0217178 A1* | 8/2009 | Niyogi | G06Q 10/00 715/753 |
| 2010/0198772 A1 | 8/2010 | Silverman | |
| 2010/0205541 A1 | 8/2010 | Rapaport | |
| 2010/0318400 A1* | 12/2010 | Geffen | G06Q 30/016 705/304 |
| 2010/0318418 A1 | 12/2010 | Wertheimer | |
| 2011/0004831 A1 | 1/2011 | Steinberg et al. | |
| 2011/0022589 A1 | 1/2011 | Bauer et al. | |
| 2011/0137737 A1 | 6/2011 | Baird | |
| 2011/0231296 A1 | 9/2011 | Gross et al. | |

(Continued)

OTHER PUBLICATIONS

Office Action dated Nov. 9, 2015 in U.S. Appl. No. 13/958,452.

(Continued)

*Primary Examiner* — Angelica Ruiz
(74) *Attorney, Agent, or Firm* — Lowenstein Sandler LLP

(57) ABSTRACT

Systems and methods for determining a user engagement level for a content item are provided. In some aspects, indicia of one or more user interactions with a content item are received. Each user interaction in the one or more user interactions has an associated time and an interaction type. A user engagement level for the content item is determined based on the one or more user interactions, the associated times, and the interaction types. The user engagement level for the content item is stored in association with the content item.

20 Claims, 10 Drawing Sheets

(56) References Cited

U.S. PATENT DOCUMENTS

| | | |
|---|---|---|
| 2011/0246574 A1 | 10/2011 | Lento et al. |
| 2011/0289139 A1 | 11/2011 | McIntosh et al. |
| 2012/0158753 A1 | 6/2012 | He et al. |
| 2012/0166532 A1 | 6/2012 | Juan |
| 2012/0221581 A1 | 8/2012 | Narayanan |
| 2012/0271831 A1 | 10/2012 | Narayanan |
| 2012/0284275 A1* | 11/2012 | Vadrevu ............... G06F 16/358 707/738 |
| 2013/0139048 A1 | 5/2013 | Dhawan et al. |
| 2013/0159110 A1* | 6/2013 | Rajaram ............... G06Q 30/02 705/14.66 |
| 2013/0212173 A1* | 8/2013 | Carthcart ............... G06Q 50/01 709/204 |
| 2013/0290430 A1 | 10/2013 | Yung et al. |
| 2013/0318180 A1* | 11/2013 | Amin .................... H04L 65/403 709/206 |
| 2013/0325948 A1 | 12/2013 | Chen et al. |
| 2013/0332523 A1 | 12/2013 | Luu |
| 2014/0013353 A1 | 1/2014 | Mathur |
| 2014/0019446 A1 | 1/2014 | He |
| 2014/0172877 A1 | 6/2014 | Rubinstein et al. |

OTHER PUBLICATIONS

Office Action dated May 20, 2016 in U.S. Appl. No. 13/958,452.
Office Action dated Dec. 20, 2016 in U.S. Appl. No. 13/958,452.
Office Action dated Apr. 4, 2017 in U.S. Appl. No. 13/958,452.
Office Action dated Nov. 2, 2017 in U.S. Appl. No. 13/958,452.
Office Action dated Jun. 27, 2018 in U.S. Appl. No. 13/958,452.
Office Action dated Jul. 16, 2015 in U.S. Appl. No. 13/971,779.
Office Action dated Mar. 24, 2016 in U.S. Appl. No. 13/971,779.
Office Action dated Feb. 24, 2017 in U.S. Appl. No. 13/971,779.
Office Action dated Dec. 18, 2017 in U.S. Appl. No. 13/971,779.
Office Action dated Jul. 27, 2018 in U.S. Appl. No. 13/971,779.
Office Action dated May 25, 2016 in U.S. Appl. No. 14/037,219.
Office Action dated Jan. 12, 2017 in U.S. Appl. No. 14/037,219.
Notice of Allowance dated Apr. 10, 2017 in U.S. Appl. No. 14/037,219.

* cited by examiner

DETERMINING A QUALITY SCORE FOR A CONTENT ITEM

CROSS REFERENCE TO RELATED APPLICATIONS

This application is a continuation of U.S. patent application Ser. No. 14/037,219, filed on Sep. 25, 2013, to be issued as U.S. Pat. No. 9,727,644, and entitled, "DETERMINING A QUALITY SCORE FOR A CONTENT ITEM," which claims the benefit of U.S. Provisional Application No. 61/707,863, filed Sep. 28, 2012, and entitled, "QUALITY SCORE FOR POSTS," and U.S. Provisional Application No. 61/707,869, filed Sep. 28, 2012, and entitled, "DETERMINING A USER ENGAGEMENT LEVEL FOR A CONTENT ITEM," the entire disclosures of which are incorporated herein by reference.

BACKGROUND

The subject technology generally relates to social networking services and, in particular, relates to determining a quality score for a content item in a social networking service.

Certain web-based applications provide information in the form of posts by a variety of users. These posts are broadcasted by populating streams. The posts are typically presented in reverse chronological order on the streams, but such an arrangement of posts may not prioritize the most informative or useful information when presented to a reader of the posts.

SUMMARY

In some innovative aspects, the disclosed subject matter can be embodied in a method. The method comprises receiving a content item authored by a first user to be displayed in a stream corresponding to a second user in a web-based application, where the received content item has an associated time stamp. A recentness score of the content item is determined based on the time stamp. An affinity score representing an affinity of the first user to the second user in the web-based application is also determined. A popularity score of the content item is determined based on user interactions with the content item. A quality score of the content item is generated based on the recentness score of the content item and a combination of the affinity score and the popularity score of the content item.

These and other embodiments can comprise one or more of the following features. The recentness score of the content item may be determined based on a half-life decay function applied to a duration calculated as a current time minus a time corresponding to the time stamp. The half-life decay function calculates a number of half-life decays by dividing the calculated duration by a predetermined half-life duration. The time stamp associated with the content item corresponds to a most recent user interaction with the content item. The user interactions with the content item may comprise one or more of updating the content item, commenting on the content item, re-sharing the content item, or endorsing the comment. The affinity of the first user and the second user in the web-based application may be determined based on at least one of a number of and a quality of communication sessions between the first user and the second user. The communication sessions comprise one or more of electronic messages, text chat sessions, audio chat sessions, or video chat sessions, each of the communication sessions having a corresponding quality from which the determination of the affinity score is based. Each of the user interactions with the content item is of a type comprising viewing the content item, selecting the content item, re-sharing the content item, commenting on the content item, or endorsing the content item, and wherein each of interactions comprises an associated time. Generating the quality score of the content item based on the combination of the affinity score and the popularity score of the content item may comprise adjusting the affinity score of the content item by a popularity score factor, adjusting the popularity score of the content item by an affinity score factor, and utilizing a higher of the adjusted affinity score and the adjusted popularity score as a factor in generating the quality score.

In some innovative aspects, the disclosed subject matter relates to a computer-readable medium encoded with executable instructions. The instructions include code for receiving indicia of one or more user interactions with a content item. Each user interaction in the one or more user interactions has an associated time and an interaction type. The instructions include code for writing, to a first memory, a log of the one or more user interactions with the content item. The instructions include code for determining a user engagement level for the content item based on the associated times and the interaction types for the one or more user interactions in the log. The instructions include code for storing the user engagement level for the content item in association with the content item.

These and other embodiments can include one or more of the following features. The interaction type includes one or more of: a user viewing the content item, the user selecting the content item, the user re-sharing the content item, the user commenting on the content item, or the user endorsing the content item. Determining the user engagement level for the content item includes determining a total count of user interactions in the log. Determining the user engagement level for the content item includes determining a total interaction rate as the total count divided by a time period since the content item was posted. Determining the user engagement level for the content item includes determining a recent count of user interactions in the one or more user interactions. The recent count corresponds to user interactions taking place within a predetermined time period before a current time. Determining the user engagement level for the content item includes determining a recent interaction rate as the recent count divided by the predetermined time period. Determining the user engagement level for the content item includes determining the user engagement level for the content item based on the total interaction rate and the recent interaction rate. The total count is weighted based on the interaction types of the user interactions in the total count and the recent count is weighted based on the interaction types of the user interactions in the recent count. The user engagement level is determined based on a ratio of the recent interaction rate to the total interaction rate. The instructions also include code for determining, based on the log, one or more counts of the user interactions with the content item. Each of the one or more counts corresponds to a time bucket, each time bucket corresponding to a predetermined time period. The instructions also include code for storing the one or more counts in association with the content item. The one or more counts are weighted based on the interaction types of the user interactions. The user engagement level is further determined based on a ratio of a count of user interactions to a number of users viewing a stream including the content item. The instructions also include code for providing the content item to a stream for a viewing user. The instructions also include code for determining that the user engagement level exceeds a threshold user engagement level. The instructions also include code for modifying a ranking of the content item in the stream based on the user engagement level exceeding the threshold user engagement level.

In some innovative aspects, the disclosed subject matter relates to a system. The system includes one or more processors and a memory. The memory includes instructions executable by the one or more processors. The instructions include code for receiving indicia of one or more user interactions with a content item. Each user interaction in the one or more user interactions having an associated time and an interaction type. The instructions include code for determining a user engagement level for the content item based on the one or more user interactions, the associated times, and the interaction types. The instructions include code for providing the content item to a stream for a viewing user. The instructions include code for determining that the user engagement level exceeds a threshold user engagement level. The instructions include code for modifying a ranking of the content item in the stream based on the user engagement level exceeding the threshold user engagement level.

Advantageously, the subject technology improves the user experience when content items provided for web-based application streams are presented in an order influenced by certain characteristics of the content items. By modifying the quality scores of the content items based on such factors as freshness, importance, relevance, or popularity, the order in which the content items are presented in a stream may be adjusted. Such adjustments may prioritize content items that are determined to be of higher interest to a user.

Advantageously, the subject technology allows for a user engagement level for a content item in a social networking service to be determined. When presenting a stream to a viewing user of the social networking service, content items having a higher user engagement level may be placed closer to the beginning of the stream or otherwise visually indicated (e.g., highlighted, underlined, or placed inside a box) to bring the user's attention to the content items and increase a probability that the user will engage with one of the content items.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
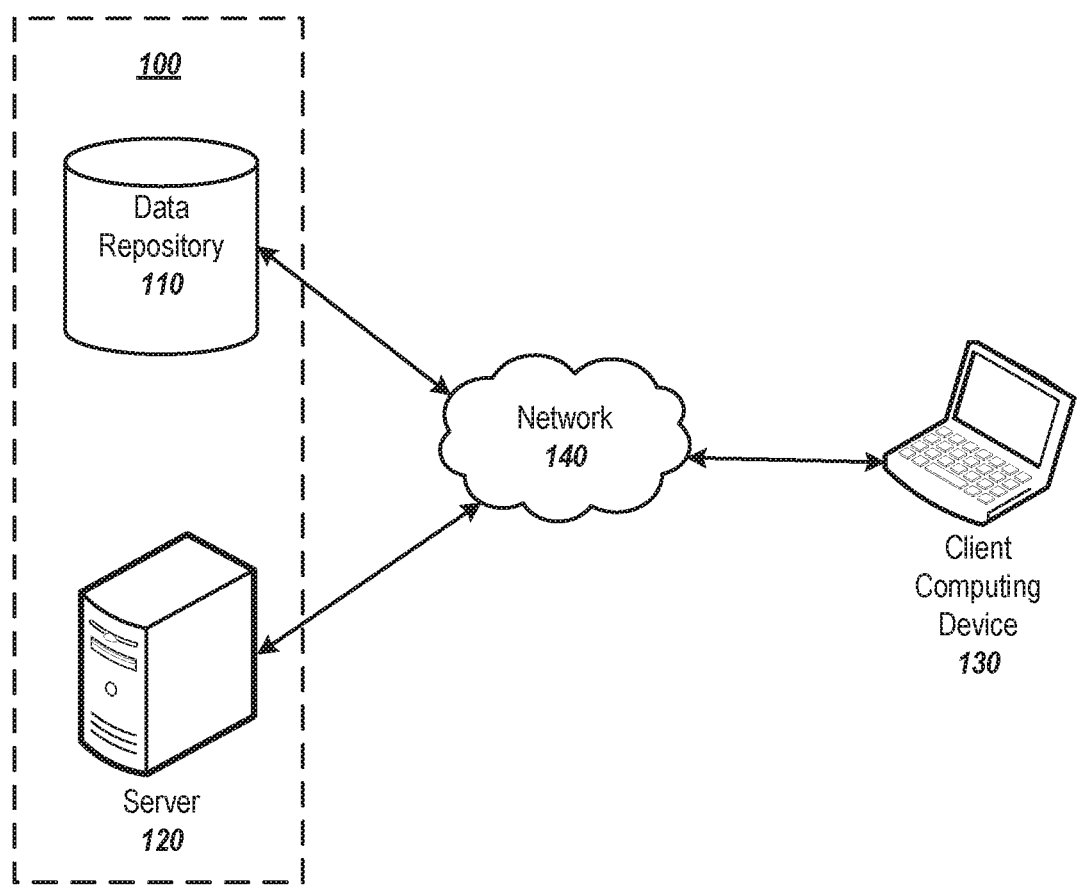
FIG. 1 illustrates an example of a system for determining a user engagement level for a content item in a social networking service.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

A new approach for determining content items that are likely to induce user engagement may be desirable, for example, for use in arranging content items in a stream of a social networking service. The subject technology provides techniques for determining a user engagement level for a content item in a social networking service. According to some aspects, a server of a social networking service receives indicia of one or more user interactions with a content item in a social networking service. Each user interaction in the one or more user interactions has an associated time and an interaction type. The interaction type can correspond to a passive interaction type or an active interaction type. Passive interaction types include, for example, the user viewing (e.g., pausing scrolling in a stream for at least a threshold time period, e.g., 2 or 3 seconds) or selecting the content item. Active interaction types include, for example, the user re-sharing the content item, commenting on the content item, or endorsing the content item. Active interaction types can also include interaction types that are not visible to other users of the social networking service, for example, selection (e.g., click) of a uniform resource locator in a content item, selection of the content item (e.g., on a mobile device), selection of an image in the content item, or expanding the content item or a comment on the content item. The server determines a user engagement level for the content item based on the one or more user interactions, their associated times, and their interaction types. The server provides the user engagement level for the content item to a memory (e.g., a local memory of the server or a data repository external to the server) for storage in association with the content item.

Some aspects of the subject technology provide techniques for calculating quality scores for content items provided in a stream on a web-based application. For example, a quality scores may be calculated for social content items that are streamed on a social networking service. According to some aspects, a server of a web-based application receives a content item authored by a first user (e.g., a social post) to be displayed in a stream corresponding to a second user in a web-based application, where the received content item has an associated time stamp. The server determines a recentness score of the content item based on the time stamp. The server may also determine an affinity score representing an affinity of the first user to the second user in the web-based application. Furthermore, the server may determine a popularity score of the content item based on user interactions with the content item. The server may then generate a quality score of the content item based on the recentness score of the content item and a combination of the affinity score and the popularity score of the content item.

Some aspects of the subject technology include storing information about users of a social networking service. For example, information may be stored indicating that a user interacted with a content item. A user about whom information is stored has the option of removing such information from storage at the social networking service. Furthermore, information about user interactions having a passive interaction type is anonymized, i.e., stored without any personal identifiable information of the associated user. The user affirmatively provides permission for information to be stored about him/her or can opt out of having information about him/her stored.

FIG. 1 illustrates an example of a system 100 for determining a user engagement level for a content item in a social networking service. As shown, the system 100 includes a data repository 110 and a server 120. The data repository 110 and the server 120 communicate with one another and with and a client computing device 130 via a network 140. The network 140 may include the Internet, an intranet, a local area network, a wide area network, a wired network, a wireless network, or a virtual private network (VPN). While only one data repository 110, server 120, and client computing device 130 are illustrated, the subject technology may be implemented in conjunction with any number of data repositories 110, servers 120, or client computing devices 130. In some aspects, a single machine may implement the functions of two or more of the data repository 110, the server 120, or the client computing device 130.

The data repository 110 stores social content item(s) (e.g., posted content item(s)) associated with the social networking service. One example of the data repository 110 is described in more detail in conjunction with FIG. 2 below.

The server 120 includes one or more modules for facilitating user interaction with the social networking service via a browser or a special purpose application executing on the client computing device 130 or for processing data stored in the data repository 110. The server 120 may be implemented as a single machine with a single processor, a multi-processor machine, or a server farm including multiple machines with multiple processors. One example of the server 120 is described in more detail in conjunction with FIG. 4 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a browser configured to display webpages, for example a webpage of the social networking service. Alternatively, the client computing device 130 may include a special-purpose application (e.g., a mobile phone or tablet computer application) for accessing the social networking service.

Figure 2:
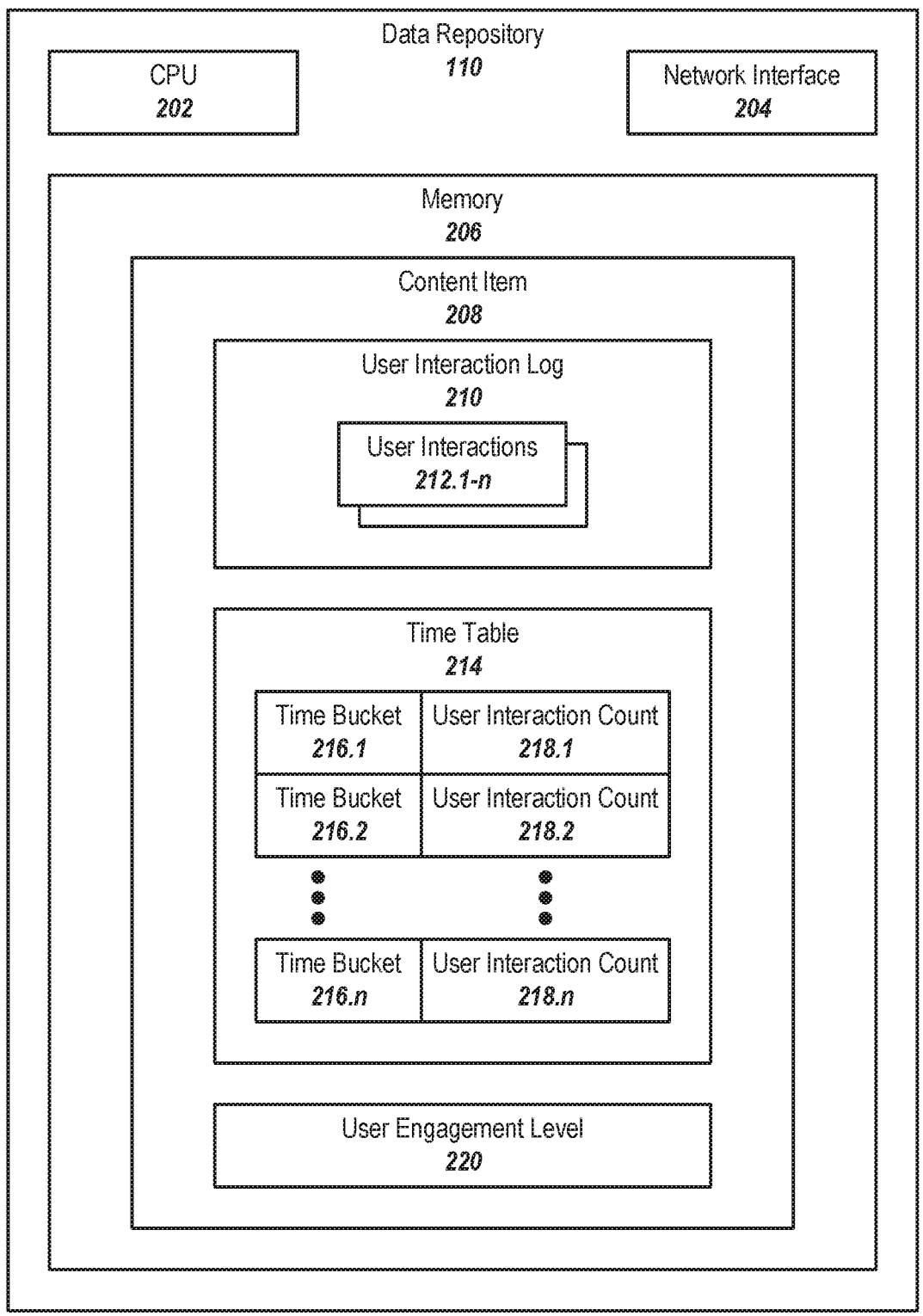
FIG. 2 illustrates an example of the data repository of FIG. 1.

FIG. 2 illustrates an example of the data repository 110 of FIG. 1. As shown, the data repository 110 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the data repository 110 to transmit and receive data in a network, e.g., network 140 of FIG. 1. The network interface 204 may include one or more network interface controllers (NICs). The memory 206 stores data and/or instructions. The memory 206 may be one or more of a cache unit, a storage unit, an internal memory unit, or an external memory unit. As illustrated, the memory 206 includes a content item 208. While the memory 206 is illustrated as including a single content item 208, the memory 206 may include multiple content items.

The content item 208 corresponds to a content item stored within a social networking service, for example, a text post, a geographic check-in, an image, an album of images, a video, an external link, information about an event, etc. As shown, the content item 208 includes a user interaction log 210, a time table 214, and a user engagement level 220.

The user interaction log 210 stores a set of user interactions 212.1-$n$ with the content item 208. The set of user interactions 212.1-$n$ can include active and passive user interactions. The active user interactions and the passive user interactions in the set of user interactions 212.1-$n$ are anonymized, i.e., stored without any personal identifiable information of the associated user. One example of a data structure for representing a user interaction (e.g., user interaction 212.1) is described below in conjunction with FIG. 3.

The time table 214 is created based on the user interaction log 210, for example, by operation of the server 120. The time table includes multiple time buckets 216.1-$n$. Each time bucket corresponds to a predetermined time period. The predetermined time periods can be fixed. For example, one time bucket 216.1 could correspond to 9:00 AM-9:10 AM on Sep. 1, 2012; another time bucket 216.2 could correspond to 9:10 AM-9:20 AM on Sep. 1, 2012; and another time bucket 216.3 could correspond to 9:20 AM-9:30 AM on Sep. 1, 2012. Alternatively, the predetermined time periods can be relative to the current time or relative to a time when the content item 208 was posted to the social networking service. For example, one time bucket 216.1 can correspond to the last 15 minutes and another time bucket 216.2 can correspond to 15-30 minutes ago. In another example, one time bucket 216.1 can correspond to the first hour after the content item 208 was posted and another time bucket 216.2 can correspond to the second hour after the content item 208 was posted.

Each time bucket 216.$k$ is associated with a user interaction count 218.$k$. The user interaction count 218.$k$ corresponds to a count of user interactions with the content item 208 (e.g., from the user interaction log 210) having a time within the time bucket 216.$k$. The user interaction count 218.$k$ can be weighted based on the interaction types of the user interactions. For example, active user interactions have a higher weight than passive user interactions. In some aspects, re-sharing has a higher weight than commenting, which has a higher weight than endorsing. Alternatively, the user interaction count may not be weighted. Each time bucket 216.$k$ is also associated with a user interaction rate.

The user interaction rate corresponds to a weighted number of active user interactions divided by weighted number of passive user interactions or a number of active user interactions divided by a number of passive user interactions.

The user engagement level 220 corresponds to a degree to which users engage (e.g., interact) with the content item 208. The user engagement level 220 may be determined based on information in the time table 214. Example techniques for determining the user engagement level 220 are described below, for example, in conjunction with FIG. 5 and FIG. 7. In some aspects, the user engagement level 220 corresponds to engagement of users in general with the content item 208, and may not be personalized for an individual user's engagement with a content item. For example, a specific user may engage with a family photograph posted by the specific user's mother, while other users of the social networking service, who are not relatives of the specific user, may not be as interested in the family photograph. In these circumstances, the family photograph may have a low user engagement level 220, even though the family photograph was very engaging for the specific user.

As illustrated, a single data repository 110 stores the user interaction log 210, the time table 214, and the user engagement level 220. However, in some aspects, all three of the user interaction log 210, the time table 214, and the user engagement level 220 can reside in different data repositories, or two could reside on the same data repository while one resides on a separate data repository. Alternatively, one or more of the user interaction log 210, the time table 214, and the user engagement level 220 can reside on the server 120.

Figure 3:
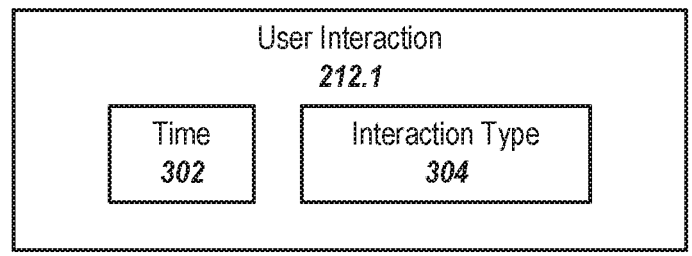
FIG. 3 illustrates an example data structure representing a user interaction.

FIG. 3 illustrates an example data structure representing a user interaction 212.1.

As shown, the user interaction 212.1 includes a time 302 and an interaction type 304. The time 302 corresponds to a time when the user interaction took place (e.g., Sep. 1, 2012, at 9:16:32 AM). The interaction type 304 corresponds to the type of user interaction, for example, viewing, selecting, re-sharing, commenting on, or endorsing the associated content item.

Figure 4:
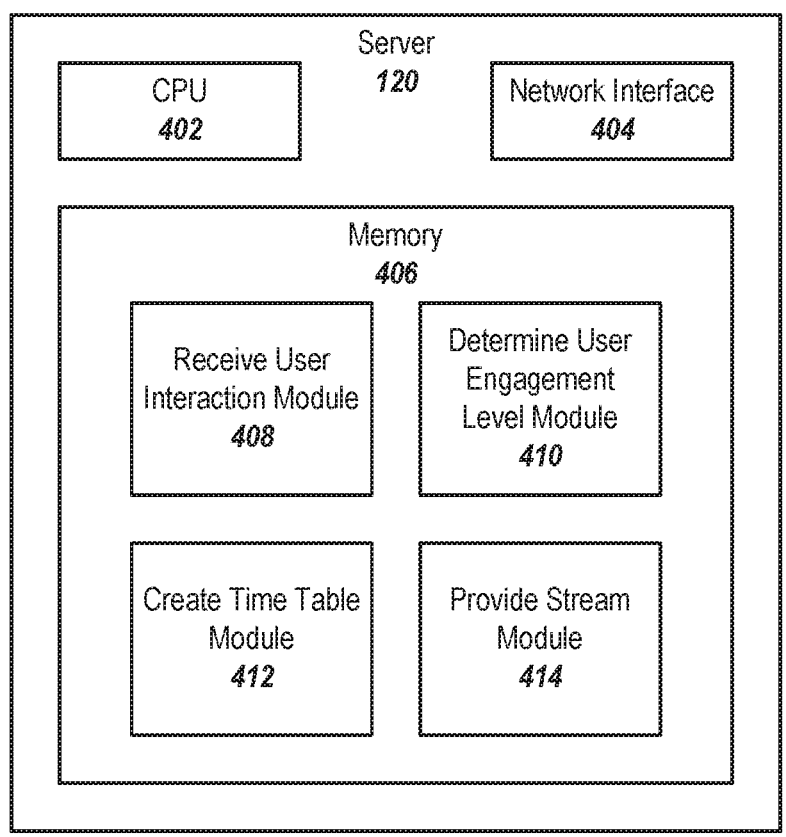
FIG. 4 illustrates an example of the server of FIG. 1.

FIG. 4 illustrates an example of the server 120 of FIG. 1. As shown, the server 120 includes a central processing unit (CPU) 402, a network interface 404, and a memory 406. The CPU 402 includes one or more processors. The CPU 402 is configured to execute computer instructions that are stored in a computer-readable medium, for example, the memory 406. The network interface 404 is configured to allow the server to transmit and receive data in a network, e.g., network 140 of FIG. 1. The network interface 404 may include one or more network interface controllers (NICs). The memory 406 stores data and/or instructions. The memory 406 may be one or more of a cache unit, a storage unit, an internal memory unit, or an external memory unit. As illustrated, the memory 406 includes a receive user interaction module 408, a determine user engagement level module 410, a create time table module 412, and a provide stream module 414.

The receive user interaction module 408 is configured to receive indicia of one or more user interactions (e.g., user interactions 212.1-n) with a content item (e.g., content item 208) in a social networking service. In some aspects, the receive user interaction module writes the indicia of the one or more user interactions to a log (e.g., user interaction log 210), and creates a time table (e.g., time table 214) associating time buckets with user interaction counts based on the log. Alternatively, the time table may be created via operation of the create time table module 412. One example of the operation of the receive user interaction module 408 is described below in conjunction with FIG. 6.

The determine user engagement level module 410 is configured to determine a user engagement level (e.g., user engagement level 220) for a content item (e.g., content item 208) based on one or more user interactions, the associated times, and the interaction types. The user engagement level may be higher if there are a large number of recent user interactions or the recent user interactions include active interactions. One example of the operation of the determine user engagement level module 410 is described below in conjunction with FIG. 7 and a block diagram of one example implementation of the determine user engagement level module 410 is described below in conjunction with FIG. 9.

The create time table module 412 is configured to create a time table (e.g., time table 214) based on a log of user interactions (e.g., user interaction log) for a content item (e.g., content item 208) by determining a user interaction count (e.g., user interaction count 218.$k$) for each time bucket (e.g., time bucket 216.$k$).

The provide stream module 414 is configured to provide a stream including multiple content items to a viewing user of the social networking service. In some examples, the stream is arranged chronologically based on a time when the content items were posted. Alternatively, a ranking of a content item in the stream may be modified from the default (e.g., chronological) ranking based on the user engagement level (e.g., user engagement level 220) for the content item exceeding a threshold user engagement level or based on other factors or other criteria. One example of the operation of the provide stream module 414 is described below in conjunction with FIG. 8.

Figure 5:
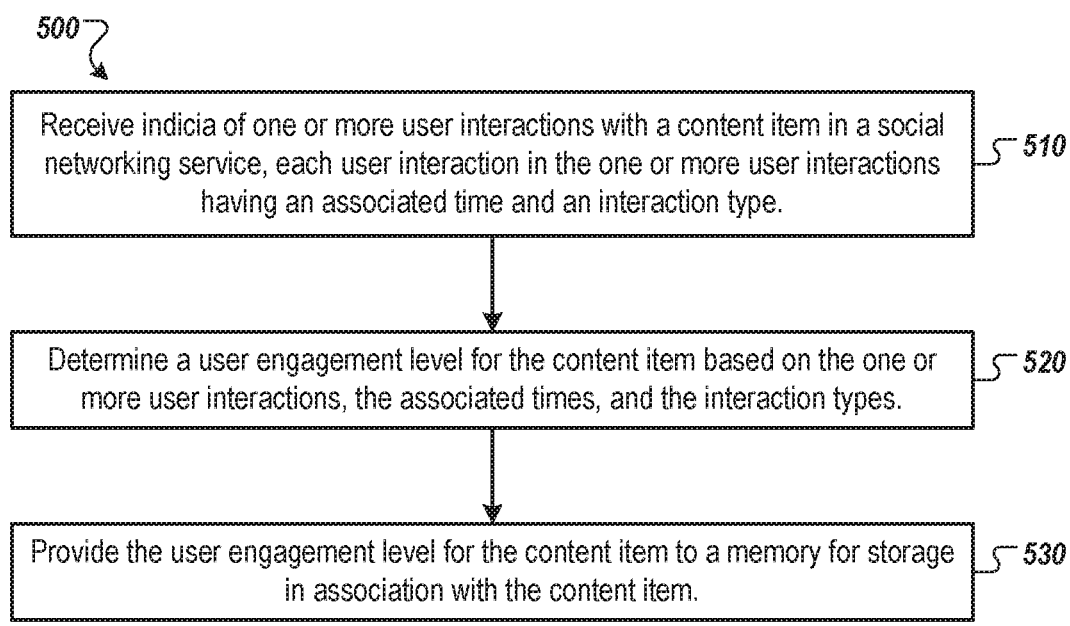
FIG. 5 illustrates an example process by which a user engagement level for a content item may be stored.

FIG. 5 illustrates an example process 500 by which a user engagement level for a content item may be stored.

The process 500 begins at step 510, where a server (e.g., server 120) receives indicia of one or more user interactions (e.g., user interactions 212.1-$n$) with a content item (e.g., content item 208) in a social networking service. Each user interaction in the one or more user interactions has an associated time (e.g., time 302) and an interaction type (e.g., interaction type 304). In some examples, step 510 is carried out by the receive user interaction module 408. One example of carrying out the step 510 is described below in conjunction with FIG. 6.

In step 520, the server determines a user engagement level (e.g., user engagement level 220) for the content item based on the one or more user interactions, the associated time, and the interaction types. In some examples, step 520 is carried out by the determine user engagement module 410. One example of carrying out the step 520 is described below in conjunction with FIG. 7.

In step 530, the server provides the user engagement level for the content item to a memory (e.g., memory 206 of data repository 110) for storage in association with the content item. After step 530, the process 500 ends.

Figure 6:
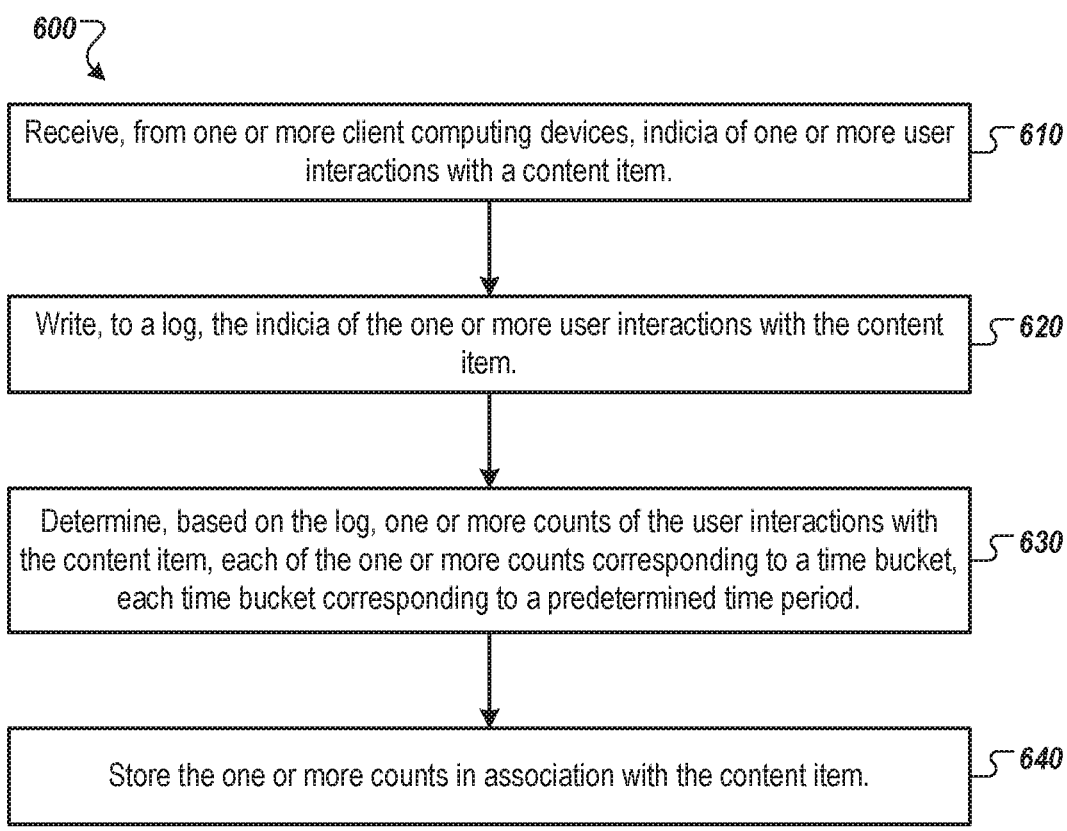
FIG. 6 illustrates an example process by which indicia of one or more user interactions with a content item may be received.

FIG. 6 illustrates an example process 600 by which indicia of one or more user interactions (e.g., user interactions 212.1-$n$) with a content item (e.g., content item 208) may be received.

The process 600 begins at step 610, where a server (e.g., server 120, via operation of the receive user interaction module 408) receives, from one or more client computing devices (e.g., client computing device 130) indicia of one or more user interactions with the content item.

In step 620, the server writes, to a log (e.g., user interaction log 210) the indicia of the one or more user interactions with the content item.

In step 630, the server (e.g., via operation of the create time table module 410) determines, based on the log, one or more counts (e.g., user interaction counts 218.1-$n$) of the user interactions with the content item. Each of the one or more counts corresponds to a time bucket (e.g., time buckets 216.1-$n$). Each time bucket corresponds to a predetermined time period. The one or more counts may be weighted based on the interaction types of the user interaction. For example, active user interactions have a higher weight than passive user interactions. In some aspects, re-sharing has a higher weight than commenting, which has a higher weight than endorsing. Alternatively, the user interaction count may not be weighted.

In step 640, the server stores the one or more counts in association with the content item. After step 640, the process 600 ends.

Figure 7:
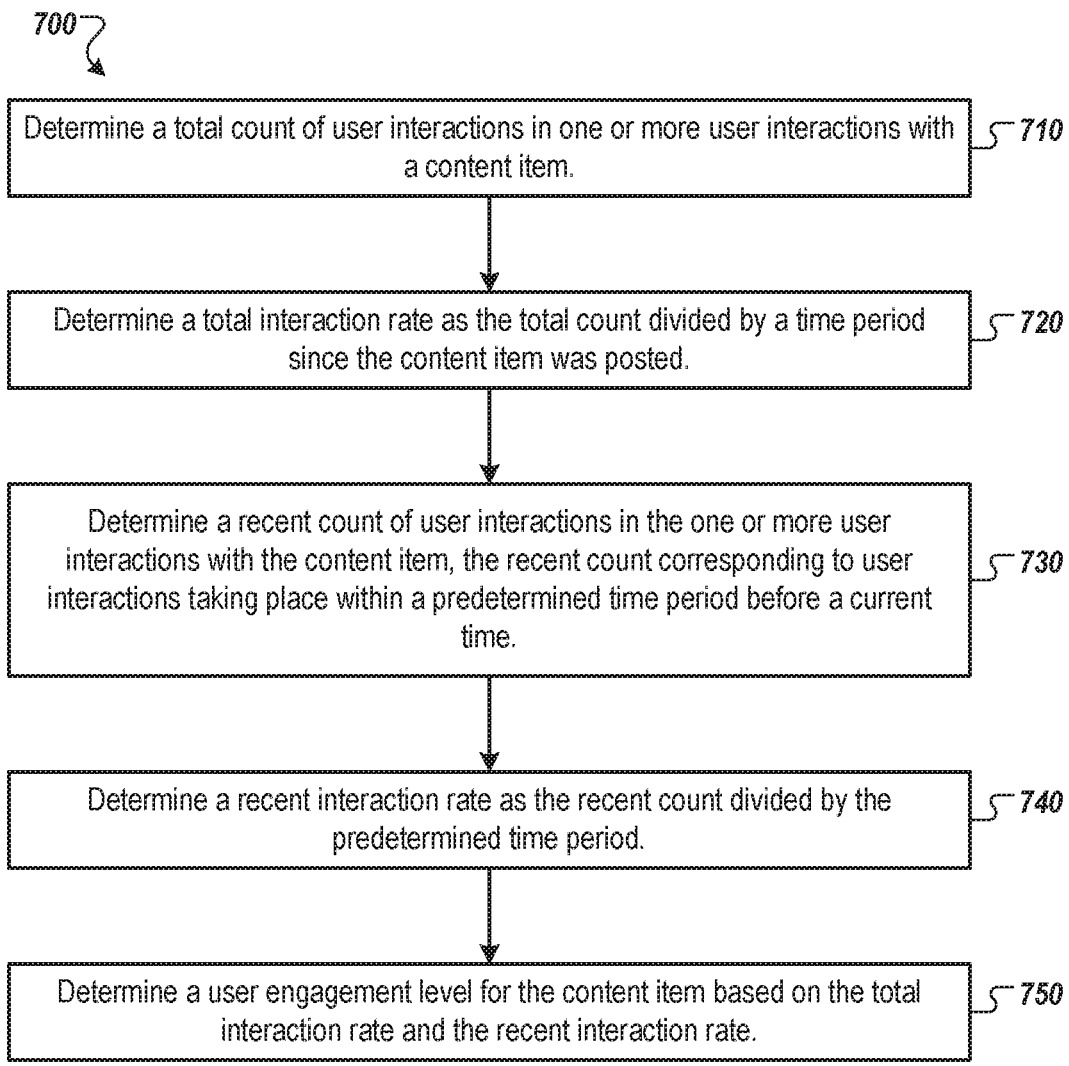
FIG. 7 illustrates an example process by which a user engagement level for a content item may be determined.

FIG. 7 illustrates an example process 700 by which a user engagement level (e.g., user engagement level 220) for a content item (e.g., content item 208) may be determined.

The process 700 begins at step 710, where a server (e.g., server 120, via operation of determine user engagement level module 410) determines a total count of user interactions in one or more user interactions with a content item. For example, the total count can correspond to all of the user interactions in a user interaction log (e.g., user interaction log 210) or all of the user interactions in all time buckets (e.g., time buckets 216.1-$n$) of a time table (e.g., time table 214).

In step 720, the server determines a total interaction rate as the total count divided by a time period since the content item was posted. For example, if there were 30 interactions with the content item and the content item was posted 3 hours ago, the total interaction rate is 30 interactions divided by 3 hours or 10 interactions per hour.

In step 730, the server determines a recent count of user interactions in the one or more user interactions with the content item. The recent count corresponds to user interactions taking place within a predetermined time period (e.g., 10 minutes, the most recent time bucket 216.$k$, or the most recent m time buckets, where m is any positive integer) before a current time.

In step 740, the server determines a recent interaction rate as the recent count divided by the predetermined time period. For example, if 4 user interactions took place within the last 10 minutes (⅙ hours), the recent interaction rate corresponds to 4 interactions divided by ⅙ hours or 24 interactions per hour.

In some aspects, the total count and the recent count correspond to a number of user interactions with the content item during the associated time period. In some aspects, the total count and the recent count are weighted based on the interaction types of the user interactions in the associated time period. For example, active user interactions have a higher weight than passive user interactions. In some aspects, re-sharing has a higher weight than commenting, which has a higher weight than endorsing. Alternatively, the user interaction count may not be weighted.

In step 750, the server determines a user engagement level for the content item based on a total interaction rate and the recent interaction rate. The user engagement level may correspond to or be determined based on a ratio of the recent interaction rate to the total interaction rate. The user engagement level may be further determined based on a ratio of a count of user interactions to a number of users viewing a stream or a page including the content item. For example, a content item presented to 50 users and interacted with by 10 users may be as engaging for users as a content item presented to 60 users and interacted with by 12 users (as 10/50=12/60). However, a content item presented to 50 users and interacted with by 11 users may be more engaging than a content item presented to 60 users and interacted with by 12 users (as 11/50>12/60). After step 750, the process 700 ends.

As the user engagement level for the content item may be based on the total interaction rate and the recent interaction rate, the user engagement level for the content item may modify with time, as more or fewer users of the social networking service interact with the content item. For example, a content item may receive multiple user interactions during a time 1-2 hours after the content item is posted, and may have a high user engagement level during this time. However, one month after the content item is posted, fewer or no users may interact with the content item, and the user engagement level of the content item may decrease.

In some aspects, a content item may be considered "viral" or exciting if the user engagement level for the content item or a ratio of the recent interaction rate to the total interaction rate exceeds a threshold ratio (e.g., 1.25, 1.5, or 2). In such circumstances, the content item is likely to be interesting for other users of the social networking service who have permission to view the content item. As a result, the content item may be visually indicated (e.g., placed closer to the beginning of the stream, highlighted, underlined, etc.). In some aspects, viral content item(s) are detected in real-time or near real-time after the content item(s) become viral, so that the viral content item(s) can be shared with other users while they are still viral (in some cases, a content item may remain viral for a few minutes or a few hours). As used herein, the phrase "real-time" encompasses its plain and ordinary meaning including, but not limited to, a calculation or determination that is delayed only by the processing speed of computer(s) carrying out the calculation and is not intentionally delayed. Depending on the processing speed of the computer(s) and the amount of computation involved, a real-time calculation or determination may take on the order of magnitude of one second, one minute, one hour, etc.

Figure 8:
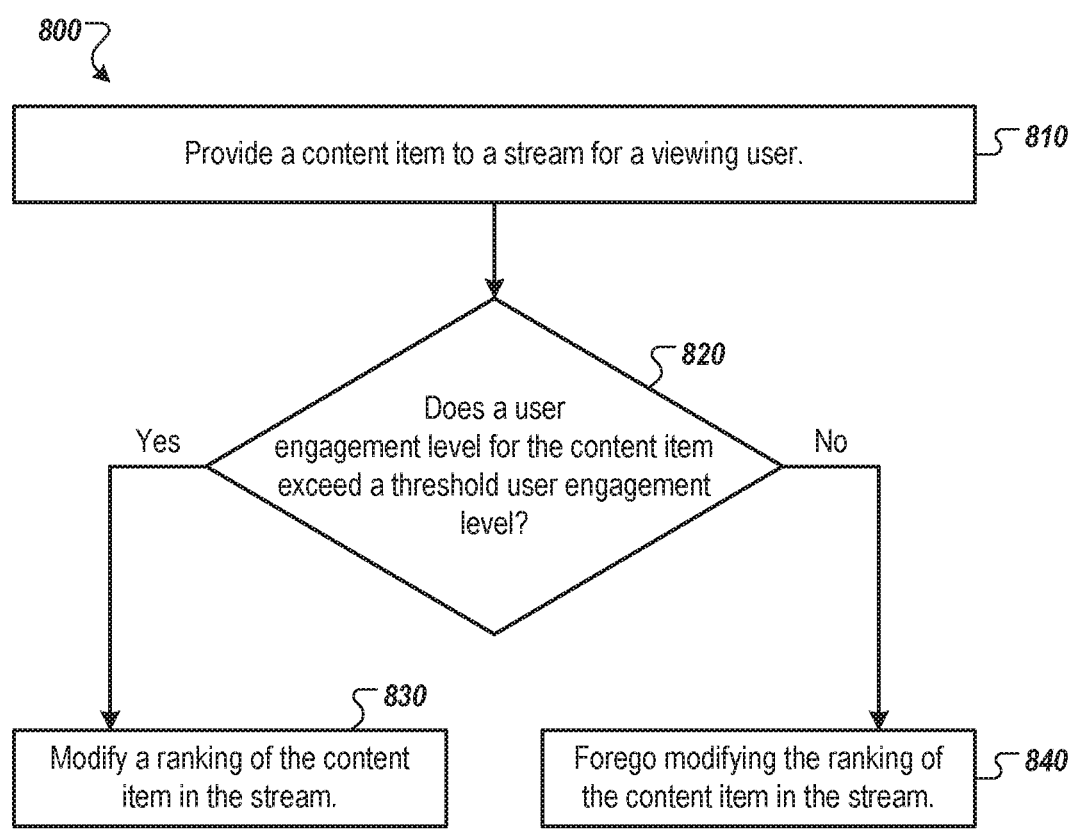
FIG. 8 illustrates an example process by which a ranking of a content item in a stream may be modified.

FIG. 8 illustrates an example process 800 by which a ranking of a content item in a stream may be modified.

The process 800 begins at step 810, where a server (e.g., server 120, via operation of provide stream module 414) provides a content item (e.g., content item 208) to a stream for a viewing user of a social networking service.

In step 820, the server determines whether a user engagement level (e.g., user engagement level 220) for the content item exceeds a threshold user engagement level. If so, the process 800 continues to step 830. If not, the process 800 continues to step 840.

In step 830, if the user engagement level for the content item exceeds the threshold user engagement level, the server modifies a ranking of the content item in the stream, for example, by moving the content item closer to a beginning (e.g., a top or left side) of the stream than a default (e.g., chronological) ranking of the content item. In some implementations, the ranking of a content item in the stream is determined based on a score of the content item, and the server modifies the score in order to modify the ranking. For example, if there are three content items with scores 80, 82, and 85, and the content item with score 80 is increased to a score of 84, the content item with score 80 will move from being presented at an end of the other two content items to in between the other two content items. After step 830, the process 800 ends.

In step 840, if the user engagement level for the content item does not exceed the threshold user engagement level, the server foregoes modifying the ranking of the content item in the stream, leaving the content item in the default ranking of the content item. After step 840, the process 800 ends.

Techniques for determining a user engagement level for a content item in a social networking service in a single iteration are described above. However, in some aspects, the user engagement level for the content item can be determined in multiple iterations, and the most engaging content items in a set of content items can be selected in multiple iterations. For example, in a first iteration, all content items that do not have any endorsements, re-shares, or comments or have less than a first threshold number (e.g., 2 or 3) of endorsements, re-shares, or comments can be filtered out. In a second iteration, a user engagement rate for the remaining content items that were not filtered out can be determined. A second threshold number (e.g., 3 or 4) of the remaining content items having the highest user engagement levels can be selected for visual indication (e.g., highlighting, underlining, or changing of a position or ranking in a stream).

Other iterative approaches can also be used in conjunction with the subject technology. For example, a first iteration can filter out content items that do not have any comments. A second iteration can filter out content items that do not have any re-shares or endorsements. A third iteration can determine the user engagement rates for the remaining content items and select a predetermined number (e.g., 3 or 4) of the remaining content items for visual indication (e.g., highlighting, underlining, or changing of a position or ranking in a stream) based on the determined user engagement levels.

Figure 9:
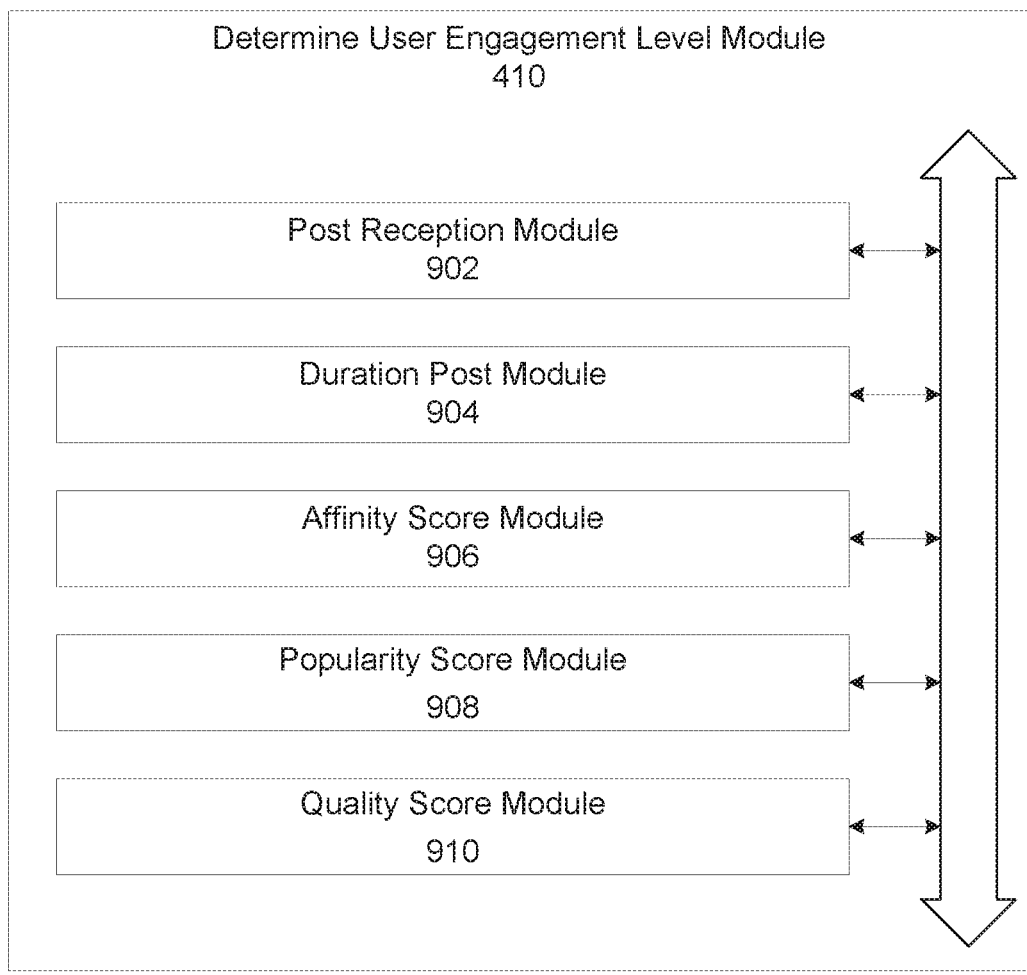
FIG. 9 illustrates an example of the determine user engagement level module of FIG. 4.

FIG. 9 illustrates an example of the determine user engagement level module 410 of FIG. 4. As shown, the determine user engagement level module 410 includes a content item reception module 902, a duration calculation module 904, an affinity score module 906, a popularity score module 908, and a quality score module 910. These modules, which are in communication with one another, process information retrieved from data repository 110 in order to calculate quality scores for content items (e.g., content item 208). For example, when a first user authors a content item that is to be displayed in a stream corresponding to a second user, the content item is received by content item reception module 902. The received content item may include a time stamp. Duration calculation module 904 calculates a length of time that has elapsed since the time of the content item's time stamp. The calculation is performed as the current time minus the time indicated in the time stamp of the content item. A recentness score is determined based on the calculated length of time. For example, the recentness score may be calculated based on a time-decay function (e.g., half-life function), as described in further detail below.

An affinity score of the content item is calculated by affinity score module 906. Affinity score module 906 is configured to calculate an affinity score for a pair of users in the web-based application. The calculated affinity score represents whether a contact is a close contact of the user (e.g., a social contact with whom the user communicates frequently). For example, the affinity score may be determined based on a number and quality of communication sessions (e.g., electronic messages, text, audio, or video chat sessions, telephone calls, etc.) between the pair of users. In some aspects, the affinity score may be normalized to a probability value, where a score above a predefined value may represent a close relationship between the pair of users (e.g., friends and family, or a content item directed by a first user to a second user).

A popularity score of the content item is calculated by popularity score module 908 based on one or more user interactions with the content item, the associated times of the interactions, and the interaction types. The popularity score may be higher if there are a large number of recent user interactions or the recent user interactions include active interactions. For example, a total count of user interactions may be determined for a content item. In some aspects, the popularity score is also taken into consideration a rate of user interactions within a recent fixed period of time (e.g., the last five hours). The popularity score of the content item may be determined based a combination of the total interaction rate and the recent interaction rate.

Once the recentness, affinity, and popularity scores have been determined, quality score module 910 may take the combination of the three scores to generate a quality score. For example, quality score module 910 may generate a quality score by factoring the recentness score with a function of the affinity and popularity scores. In some aspects, the function of the affinity and popularity scores is used to determine if either of the scores is particularly strong, and to put a higher emphasis on the stronger score. Thus, a content item having either a high affinity score or a high popularity score may produce a higher factoring value to be used to calculate the quality score (as opposed to an intermediate affinity score and an intermediate popularity scores). Once a quality score has been calculated by quality score module 910, the content item may be provided with the associated quality for populating a stream based on the quality score. Additional functions may be applied to the quality score to take into consideration other characteristics of the content item when determining the priority of the presentation of the content item in the stream.

Figure 10:
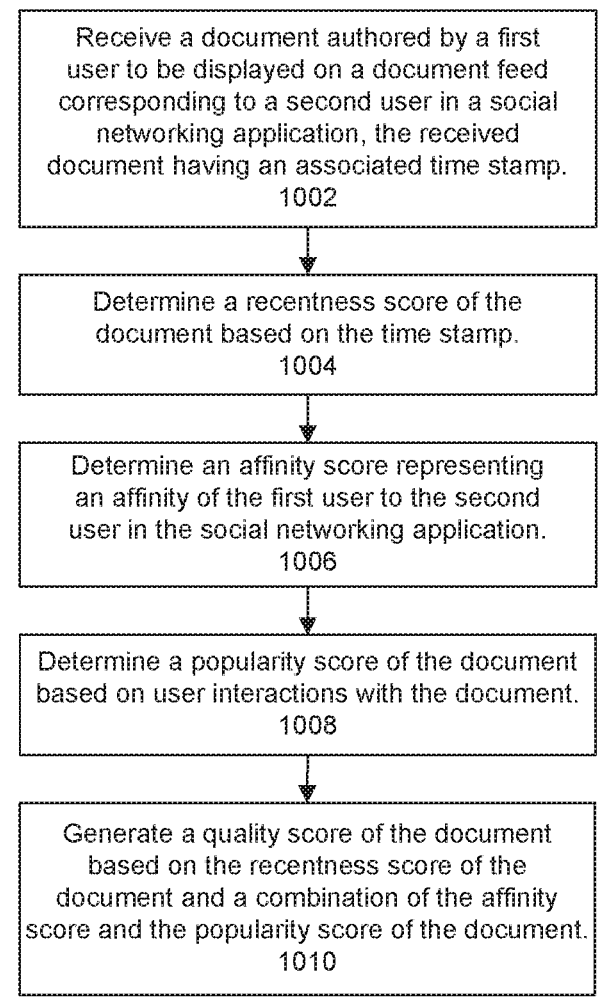
FIG. 10 illustrates an example method for calculating quality scores for content items.

FIG. 10 illustrates an example process for calculating quality scores for content items. The process 1000 begins at step 1002, where a content item authored by a first user to be displayed in a stream corresponding to a second user in a web-based application is received. The received content item includes an associated time stamp. The content item may be one of a variety of content items entered by a user of a web-based application. For example, the content item may include media such as text, a picture, an audio file, a video file, a hyperlink to a webpage, etc. The content item may also include a combination of two or more media. In some aspects, the content item may be shared with a limited group of users (e.g., the author may share the content item with an individual contact, or a group of contacts). Alternatively, the content item may be shared publicly.

In step 1004, a recentness score of the content item is determined based on the time stamp of the content item. To determine the recentness score, a length of time that has elapsed since the time of the content item's time stamp is calculated (e.g., the current time minus the time indicated in the time stamp of the content item). The recentness score may be determined based on the calculated length of time. In some aspects, the recentness score may be calculated based on a time-decay function (e.g., half-life function). For example, a predetermined half-life of a specified period (e.g., one day) of time may be applied. Thus, if a recentness score is calculated as a value in the range of 0 to 1 with one being the most recent, then a content item that is exactly one day old will have a value of 0.5, as determined by the half-life. A content item that is two days old will have a value of 0.25, and so on. While the example utilizes a half-life of one day, the predetermined half-life may be set to be any value of time. The purpose of calculating a recentness score is to provide a preference for content items that have been authored more recently over those that were authored less recently.

In some implementations, the time stamp of the content item may be updated based on user interactions with the content item. For example, a user viewing the content item may select the content item, re-share the content item, comment on the content item, or endorse the content item. When one of the above-described user interactions is performed on the content item, the time stamp of the content item may be set to the time that the user interaction is performed. As a result of the newly set time stamp, the recentness score of the content item may be increased.

An affinity score representing an affinity of the first user to the second user in the web-based application is determined in step 1006. In some aspects, the calculations are performed on a periodic basis (e.g., daily, weekly, or monthly). The calculated affinity score represents whether the contact is a close contact of the user (e.g., a social contact with whom the user communicates frequently). For example, the affinity score may be determined based on a number and quality of communication sessions (e.g., electronic messages, text, audio, or video chat sessions, telephone calls, etc.) between the pair of users. As the number of communication sessions shared between a pair of users increases, the affinity score also increases. Each type of communication session may also have different quality characteristics such that certain types of communication sessions may increase the affinity score more than others. For example, a message directed from a first user to a second user may increase the affinity score more than a message that is broadcasted by the first user to a group of users including the second user.

The effects of each communication session on the affinity score may be adjusted according to a time-decay function. For example, the effect of a communication session between two users may be reduced by a half when a certain predefined period of time has elapsed since the communication session. In some aspects, the affinity score is a normalized probability value representing the likelihood that the second user will interact with a content item given that the content item was authored by the first user.

A popularity score of the content item is determined based on user interactions with the content item in step 1008. The popularity score of the content item may be calculated based on one or more user interactions and the associated times. The popularity score may be determined to be higher if there are a large number of recent user interactions or the recent user interactions include active interactions. In some aspects, a total count of user interactions may be determined for a content item. The total count may be divided by a time period since the content item was posted to generate a rate (e.g., number of user interactions per unit of time). Thus, if there were 30 interactions with the content item and the content item was posted 3 hours ago, then the interaction rate is calculated to be 10 interactions per hour. In some aspects, the popularity score may also take into consideration a rate of user interactions within a recent fixed period of time (e.g., the last five hours). The total count and the recent count, once calculated, may be weighted based on the interaction types of the user interactions in the associated time period. For example, active user interactions have a higher weight than passive user interactions. In some aspects, re-sharing has a higher weight than commenting, which has a higher weight than endorsing. Alternatively, the user interaction count may not be weighted.

The popularity score may also correspond to a ratio of the recent interaction rate to the total interaction rate, where a higher ratio of recent to total interactions produces a higher popularity score than a lower ratio. Additionally, the score may be determined based on a ratio of a count of user interactions to a number of users viewing a stream or a page including the content item. For example, a content item that is presented to 50 users and interacted with by 10 users may be as engaging for users as a content item presented to 300 users and interacted with by 60 users, as both ratio of presentation to interaction are the identical. However, a content item presented to 50 users and interacted with by 11 users may be determined to be more engaging than a content item presented to 60 users and interacted with by 12 users, as the former ratio is larger than the latter.

As the popularity of the content item may be based on the total interaction rate and the recent interaction rate, the popularity score for the content item may change with time, as more or fewer users of the web-based application interact with the content item. For example, a content item may receive multiple user interactions during a period in the first two hours after the content item is posted, and may have a high popularity score during this time. However, when fewer users interact with the content item at another period of time, the popularity score of the content item may decrease. In some aspects, the popularity score may also be normalized to be a probability value. Thus, popularity score is representative of a probability that any user will interact with a particular content item.

Once the recentness, affinity, and popularity scores have been determined, a quality score of the content item may be generated in step 1010. The quality score may be generated based on the recentness score of the content item and a combination of the affinity score and the popularity score of the content item. In some aspects, the recentness score may be factored with a function of the affinity and popularity scores. A linear function may be applied to the affinity and popularity scores to emphasize a strength in either the affinity score or the popularity score. The linear function, for example, may take the higher of the following two scores:

$$score1 = affinity\ score \times f(popularity\ score);\ and$$

$$score2 = popularity\ score \times f(affinity\ score),$$

where f(popularity score) is a factor based on the popularity of the content item, and where f(affinity score) is a factor based on the affinity of the content item. The affinity score and the popularity score are normalized to produce factors normalized to a fixed range of values. That factor is then multiplied by the score of the other characteristic (e.g., the affinity score is multiplied by the popularity factor, and the popularity score is multiplied by the affinity factor). Using factors that are within a normalized a range ensures that the affinity or popularity score is not unduly minimized by a low complementary factor.

Additionally, taking the maximum of score1 and score2, as shown in this example, magnifies the effect of either a high affinity score or a high popularity score when calculating the quality score. Thus, a content item having either a high affinity score or a high popularity score may produce a higher factoring value to be used to calculate the quality score than a content item having two intermediate values. Once a quality score has been calculated, the content item may be provided with the associated quality for populating a stream based on the quality score.

In some implementations, a topicality of the content item may also be factored into the calculation of the quality score of the content item. Topicality represents how well a content item matches the user's interests. For example, if a user has indicated a particular interest in football (e.g., through profile preferences), a content item that is related to football may result in a topicality factor that increases the quality score of the content item. The user interest may be determined based on information that is explicitly or implicitly provided by the user (e.g., preferences specified in the user's profile, user interaction with other content items, etc.). The user affirmatively provides permission for such information to be stored and may opt out of having such information available when quality scores are calculated. For example, the user may choose to not have this information stored by the web-based application.

In some aspects, the quality scoring of content items may be processed iteratively to reduce the amount of processing required. Each of the scoring factors—recentness, affinity, popularity, and topicality, in this case—may be processed individually and sequentially. For example, a recentness score of content items may be determined first. Once determined, a subset of the content items that have a recentness score above a predetermined threshold is selected for further processing. Affinity scores may be determined for the subset of content items next, followed by a determination of popularity scores and then topicality scores. With each score determination, only the content items that satisfy a predetermined threshold value are maintained for subsequent score determinations. Content items that have scored low on any one of the scoring factors are filtered out, thereby reducing the number of content items that are to be processed for a next scoring factor. In some aspects, the order of the iterative process may be altered. Furthermore, when two factors are required to calculate a single score (e.g., the affinity score is adjusted by a popularity score factor or the popularity score is adjusted by an affinity score factor), the iterative process may determine the scores in parallel before filtering out the content items that do not satisfy a threshold value.

Some aspects of the subject technology include storing information about users of a web-based application. For example, information indicating that a user interacted with a content item may be stored. An option to remove such information from storage or to not store the information altogether may be provided to the user by the web-based application. Furthermore, information about user interactions having a passive interaction type may be anonymized (e.g., stored without any personal identifiable information of the associated user).

Figure 11:
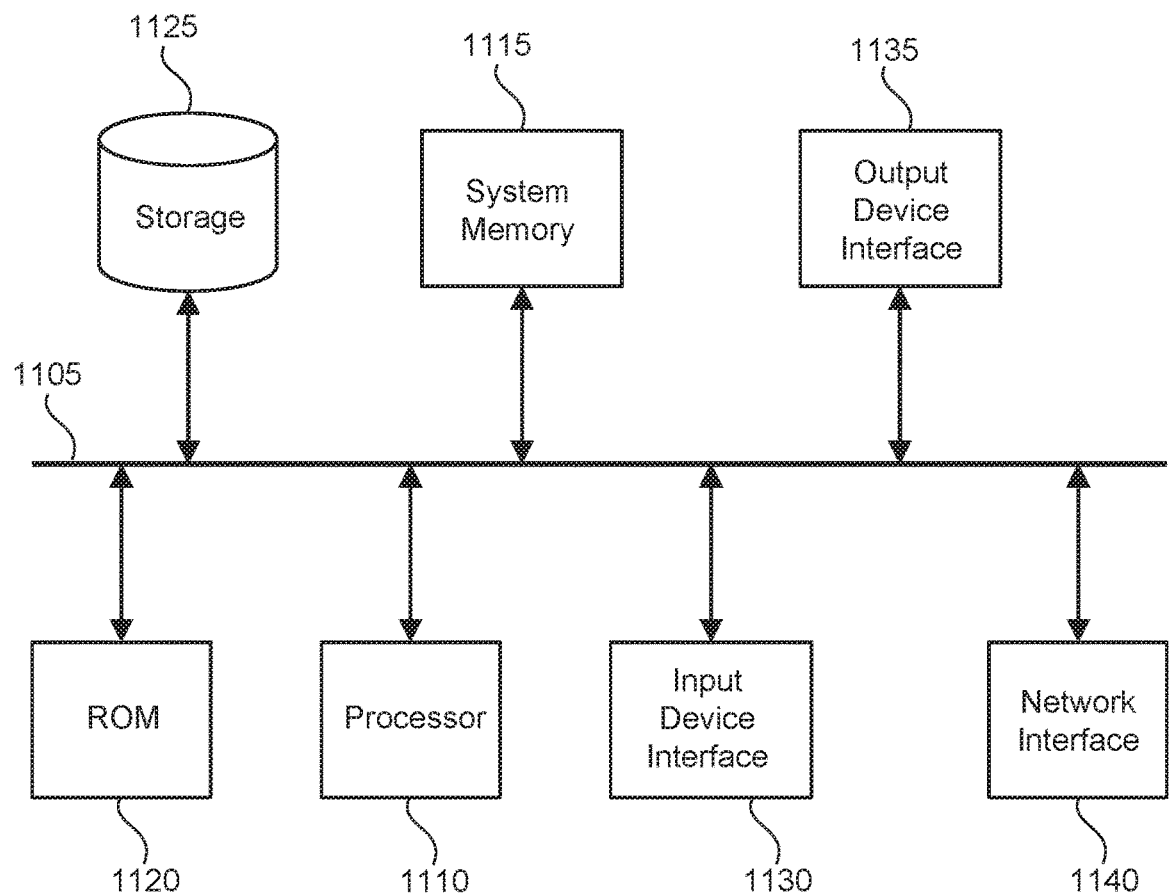
FIG. 11 conceptually illustrates an example electronic system with which some implementations of the subject technology are implemented.

FIG. 11 conceptually illustrates an electronic system 1100 with which some implementations of the subject technology are implemented. For example, one or more of the data repository 110, the server 120, or the client computing device 130 may be implemented using the arrangement of the electronic system 1100. The electronic system 1100 can be a computer (e.g., a mobile phone, PDA), or any other sort of electronic device. Such an electronic system includes various types of computer readable media and interfaces for various other types of computer readable media. Electronic system 1100 includes a bus 1105, processing unit(s) 1110, a system memory 1115, a read-only memory 1120, a permanent storage device 1125, an input device interface 1130, an output device interface 1135, and a network interface 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1120, the system memory 1115, and the permanent storage device 1125.

From these various memory units, the processing unit(s) 1110 retrieves instructions to execute and data to process in order to execute the processes of the subject technology. The processing unit(s) can be a single processor or a multi-core processor in different implementations.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some implementations of the subject technology use a mass-storage device (for example a magnetic or optical disk and its corresponding disk drive) as the permanent storage device 1125.

Other implementations use a removable storage device (for example a floppy disk, flash drive, and its corresponding disk drive) as the permanent storage device 1125. Like the permanent storage device 1125, the system memory 1115 is a read-and-write memory device. However, unlike storage device 1125, the system memory 1115 is a volatile read-and-write memory, such a random access memory. The system memory 1115 stores some of the instructions and data that the processor needs at runtime. In some implementations, the processes of the subject technology are stored in the system memory 1115, the permanent storage device 1125, or the read-only memory 1120. For example, the various memory units include instructions for determining a quality score for a content item in a social networking service in accordance with some implementations. From these various memory units, the processing unit(s) 1110 retrieves instructions to execute and data to process in order to execute the processes of some implementations.

The bus 1105 also connects to the input and output device interfaces 1130 and 1135. The input device interface 1130 enables the user to communicate information and select commands to the electronic system. Input devices used with input device interface 1130 include, for example, alphanumeric keyboards and pointing devices (also called "cursor control devices"). Output device interfaces 1135 enables, for example, the display of images generated by the electronic system 1100. Output devices used with output device interface 1135 include, for example, printers and display devices, for example cathode ray tubes (CRT) or liquid crystal displays (LCD). Some implementations include devices for example a touch screen that functions as both input and output devices.

Finally, as shown in FIG. 11, bus 1105 also couples electronic system 1100 to a network (not shown) through a network interface 1140. In this manner, the electronic system 1100 can be a part of a network of computers (for example a local area network ("LAN"), a wide area network ("WAN"), or an Intranet, or a network of networks, for example the Internet. Any or all components of electronic system 1100 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A system comprising:
one or more processors; and
a memory comprising instructions which, when executed by the one or more processors, cause the one or more processors to implement a method, the method comprising:
receiving indicia of one or more user interactions by a user with a content item, each user interaction having an associated time and an interaction type;
determining a user engagement level for the content item based on the associated times and the interaction types of the one or more user interactions, the determining comprising:
determining a first interaction rate as a first count of user interactions with the content item within a first time period divided by the first time period;
determining a second interaction rate as a second count of user interactions with the content item within a second time period different from the first time period, divided by the second time period; and
determining the user engagement level for the content item based on the first and second interaction rates; and
modifying a ranking of the content item in a stream for a viewing user when the user engagement level exceeds a threshold user engagement level.

2. The system of claim 1, wherein the interaction type comprises one or more of: a user viewing the content item, the user selecting the content item, the user re-sharing the content item, the user commenting on the content item, or the user endorsing the content item.

3. The system of claim 1, wherein the first count is weighted based on the interaction types of the user interactions in the first count and the second count is weighted based on the interaction types of the user interactions in the second count.

4. The system of claim 1, wherein the user engagement level is determined based on a ratio of the second interaction rate to the first interaction rate.

5. The system of claim 1, the method further comprising:
writing a log of the one or more user interactions with the content item;
determining, the first and second counts based on the log; and
storing the first and second counts in association with the content item.

6. The system of claim 5, wherein the first and second counts are weighted based on the interaction types of the user interactions.

7. The system of claim 1, wherein the user engagement level is further determined based on a ratio of a count of user interactions to a number of users viewing a stream comprising the content item.

8. The system of claim 1, the method further comprising:
providing the content item to the stream; and
determining that the user engagement level exceeds the threshold user engagement level.

9. A computer-implemented method comprising:
receiving indicia of one or more user interactions by a user with a content item, each user interaction having an associated time and an interaction type;
determining a user engagement level for the content item based on the associated times and the interaction types of the one or more user interactions, the determining comprising:
determining an interaction rate as a count of user interactions with the content item within a time period divided by the time period; and
determining the user engagement level for the content item based on the interaction rate; and
modifying a ranking of the content item in a stream for a viewing user when the user engagement level exceeds a threshold user engagement level.

10. The method of claim 9, wherein the interaction type comprises one or more of: a user viewing the content item, the user selecting the content item, the user re-sharing the content item, the user commenting on the content item, or the user endorsing the content item.

11. The method of claim 9, wherein the count is weighted based on the interaction types of the user interactions in the count.

12. The method of claim 9, further comprising:
writing a log of the one or more user interactions with the content item;
determining, the count based on the log; and
storing the count in association with the content item.

13. The method of claim 12, wherein the count is weighted based on the interaction types of the user interactions.

14. The method of claim 9, wherein the user engagement level is further determined based on a ratio of a count of user interactions to a number of users viewing a stream comprising the content item.

15. The method of claim 9, further comprising:
providing the content item to the stream; and
comparing the user engagement level to the threshold user engagement level.

16. A non-transitory computer-readable medium comprising instructions which, when executed by one or more computers, cause the one or more computers to implement a method, the method comprising:
receiving indicia of one or more user interactions by a user with a content item, each user interaction having an associated time and an interaction type;
determining a user engagement level for the content item based on the associated times and the interaction types of the one or more user interactions, the determining comprising:
determining a first interaction rate as a first count of user interactions with the content item within a first time period divided by the first time period; and
determining the user engagement level for the content item based on the first interaction rate; and
modifying a ranking of the content item in a stream for a viewing user when the user engagement level exceeds a threshold user engagement level.

17. The computer-readable medium of claim 16, the determining a user engagement further comprising:
determining a second interaction rate as a second count of user interactions with the content item within a second time period divided by the second time period; and
determining the user engagement level for the content item based on the first and second interaction rates.

18. The computer-readable medium of claim 16, the method further comprising:
writing a log of the one or more user interactions with the content item;
determining, the first count based on the log; and
storing the first count in association with the content item.

19. The computer-readable medium of claim 18, wherein the first count is weighted based on the interaction types of the user interactions.

20. The computer-readable medium of claim 16, wherein the user engagement level is further determined based on a ratio of a count of user interactions to a number of users viewing a stream comprising the content item.

* * * * *